(12) United States Patent
Marciano et al.

(10) Patent No.: US 10,311,148 B2
(45) Date of Patent: *Jun. 4, 2019

(54) METHODS AND SYSTEMS FOR MULTI-ENGINE MACHINE TRANSLATION

(71) Applicant: Lionbridge Technologies, Inc., Waltham, MA (US)

(72) Inventors: James Peter Marciano, Amherst, NH (US); Dean S. Blodgett, Tewksbury, MA (US)

(73) Assignee: Lionbridge Technologies, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,949

(22) Filed: Jul. 18, 2017

(65) Prior Publication Data

US 2017/0344537 A1  Nov. 30, 2017

Related U.S. Application Data

(63) Continuation of application No. 14/835,783, filed on Aug. 26, 2015, now Pat. No. 9,747,284, which is a
(Continued)

(51) Int. Cl.
*G06F 17/00* (2019.01)
*G06F 17/28* (2006.01)
*G10L 15/26* (2006.01)

(52) U.S. Cl.
CPC ........... *G06F 17/289* (2013.01); *G06F 17/28* (2013.01); *G06F 17/2836* (2013.01); *G10L 15/26* (2013.01)

(58) Field of Classification Search
CPC ................ G06F 17/28; G06F 17/289
(Continued)

(56) References Cited

U.S. PATENT DOCUMENTS

| 5,761,640 A | 6/1998 | Kalyanswamy et al. |
| 5,787,386 A | 7/1998 | Kaplan et al. |

(Continued)

OTHER PUBLICATIONS

International Search Report and Written Opinion for PCT/US13/34239, dated Sep. 5, 2013, 12 pages.
(Continued)

*Primary Examiner* — Daniel Abebe
(74) *Attorney, Agent, or Firm* — Blueshift IP, LLC; Cynthia M. Gilbert

(57) ABSTRACT

A method for machine translation, comprising receiving a source string in a source language, an indication of a target language, and user identification information. The method includes using the user identification information to identify at least one memory with user-specific translation data. The method includes tokenizing the source string, using at least one processor, to produce a tokenized source string comprising any unique temporary textual elements associated with corresponding target textual elements during tokenization. The method includes obtaining a translated string from a translator, the translated string being at least a partial translation of the tokenized source string and including all of the unique temporary textual elements. The method includes generating an output string using at least one processor, the generation comprising replacing all of the unique temporary textual elements in the translated string with the associated target textual elements.

15 Claims, 10 Drawing Sheets

Related U.S. Application Data continuation of application No. 13/834,331, filed on Mar. 15, 2013, now Pat. No. 9,141,606.

(60) Provisional application No. 61/617,341, filed on Mar. 29, 2012.

(58) Field of Classification Search
USPC .......................................................... 704/2
See application file for complete search history.

(56) References Cited

U.S. PATENT DOCUMENTS

| | | | |
|---|---|---|---|
| 5,960,080 | A | 9/1999 | Fahlman et al. |
| 6,327,561 | B1 | 12/2001 | Smith et al. |
| 6,393,389 | B1 | 5/2002 | Chanod et al. |
| 7,020,601 | B1 | 3/2006 | Hummel et al. |
| 7,711,546 | B2 | 5/2010 | Marti et al. |
| 7,860,706 | B2 | 12/2010 | Abir |
| 8,050,907 | B2 | 11/2011 | Baisley et al. |
| 8,249,856 | B2 * | 8/2012 | Shen .................. G06F 17/2872 704/2 |
| 2001/0029455 | A1 | 10/2001 | Chin et al. |
| 2003/0004703 | A1 | 1/2003 | Prabhakar et al. |
| 2003/0033312 | A1 | 2/2003 | Koizumi et al. |
| 2004/0102957 | A1 | 5/2004 | Levin |
| 2005/0251381 | A1 | 11/2005 | Pentheroudakis et al. |
| 2006/0100853 | A1 | 5/2006 | McEntee |
| 2006/0277029 | A1 | 12/2006 | Green et al. |
| 2008/0040094 | A1 | 2/2008 | Wolgemuth et al. |
| 2008/0040096 | A1 | 2/2008 | Osada et al. |
| 2008/0103756 | A1 | 5/2008 | Singh et al. |
| 2008/0215309 | A1 | 9/2008 | Weischedel et al. |
| 2009/0240487 | A1 | 9/2009 | Shen et al. |
| 2009/0319257 | A1 * | 12/2009 | Blume .................. G06F 17/278 704/7 |
| 2010/0174527 | A1 | 7/2010 | Sadamasa |
| 2010/0198581 | A1 | 8/2010 | Ellis |
| 2011/0040552 | A1 * | 2/2011 | Van Guilder ......... G06F 17/246 704/4 |
| 2011/0137636 | A1 | 6/2011 | Srihari et al. |
| 2011/0202334 | A1 | 8/2011 | Abir |

OTHER PUBLICATIONS

Non-Final Rejection dated Dec. 23, 2016 for U.S. Appl. No. 14/835,783 of James Peter Marciano, filed Aug. 26, 2015, 11 pages.
Non-Final Rejection dated Dec. 29, 2014 for U.S. Appl. No. 13/834,331 of James Peter Marciano, filed Mar. 15, 2013, 9 pages.
Examination Report dated Dec. 3, 2018, in Canadian patent application No. 2867880, 4 pages.
U.S. Appl. No. 13/834,331, filed Mar. 15, 2013.
U.S. Appl. No. 14/835,783, filed Aug. 26, 2015.

* cited by examiner

| Translation using only a third-party translation engine | Translation in accordance with an exemplary embodiment |
|---|---|
| Original source string:<br>Hola. Me llamo Estivan Rodriguez. He sido un cliente de Solar Energy Solutions durante seis años. Mi número de cuenta es 5474-345J-324M. Tenemos un problema con nuestro calentador solar. Creo que esto es la gota que colma el vaso. Por favor llámeme al 212-555-1234 (durante el día) o 212-555-5678 (por la tarde) para discutir esto. | Original source string:<br>Hola. Me llamo Estivan Rodriguez. He sido un cliente de Solar Energy Solutions durante seis años. Mi número de cuenta es 5474-345J-324M. Tenemos un problema con nuestro calentador solar. Creo que esto es la gota que colma el vaso. Por favor llámeme al 212-555-1234 (durante el día) o 212-555-5678 (por la tarde) para discutir esto. |
|  | Tokenized source string:<br>Hola. Me llamo <CUSTOMERNAME1>. He sido un cliente de <GLOSSARYITEM1> durante seis años. Mi <GLOSSARYITEM2> es <ACCOUNTNUMBER1>. Tenemos un problema con nuestro <GLOSSARYITEM3>. <TRANSLATIONMEMORYITEM1> Por favor llámeme al <TELEPHONENUMBER1> (durante el día) o <TELEPHONENUMBER2> (por la tarde) para discutir esto. |
|  | Translation of tokenized string:<br>Hello. My name is <CUSTOMERNAME1>. I've been a customer of <GLOSSARYITEM1> for six years. My <GLOSSARYITEM2> is <ACCOUNTNUMBER1>. We have a problem with our <GLOSSARYITEM3>. <TRANSLATIONMEMORYITEM1> Please call me at <TELEPHONENUMBER1> (Daytime) or <TELEPHONENUMBER2> (Afternoon) to discuss this. |
| Final translation from third-party translation engine:<br>Hello. My name is Steven Rodriguez. I have been a customer of Solares Energy Solutions for six years. My number of account is 5474345j324m. We have a problem with our heater solar. I think this is the drop that spills the glass. Please call me at 555-212-1234 (Daytime) or 212- 555 -5678 (Afternoon) to discuss this. | Final translation with re-inserted private information:<br>Hello. My name is Estivan Rodriguez. I've been a customer of Solar Energy Solutions for six years. My account number is 5474-345J-324M. We have a problem with our solar heater. I think this is the straw that breaks the camel's back. Please call me at 212-555-1234 (Daytime) or 212-555-5678 (Afternoon) to discuss this. |

FIG. 6

| Home | Manage Tenancies | TM | Glossary | Regular Expressions | Language Technology Diagnostics | About | [ Log In ] |

Manage Regular Expressions

Tools
Insert from Expression Library
Regex Tester

Add Regular Expression
Select Profile: ACME CORP ▼
Token Pattern:       Language: English (US) ▼   [Add Token]

Manage Regular Expressions List

>>>

| | Pattern | Source Language |
|---|---|---|
| Edit Delete | (?<=[ ])(\+?1?[-. ]?\(?\d{3}\)?[-. ]?)?\d{4}[(. )]\b(e[E]?(x|X)([tT])? ?(. ?)?\d{1,5})?\d | English (US) |
| Edit Delete | (?<=[ ])(?:?\d{4})[-. ]?)?\d{4}[(. )]\b(e[E]?(x|X)([tT])? ?(. ?)?\d{1,5})?\d | English (US) |
| Edit Delete | \d{3}-\d{2}-\d{4} | English (US) |
| Edit Delete | \b[A-Za-z0-9._%+-]+@[A-Za-z]{2,4}\b | English (US) |
| Edit Delete | (?<=[ ])(\+?1?[-. ]?\(?\d{3}\)?[-. ]?)?\d{4}[(. )]\b(e[E]?(x|X)([tT])? ?(. ?)?\d{1,5})?\d | French (Standard) |
| Edit Delete | (?<=[ ])(?:?\d{4})[-. ]?)?\d{4}[(. )]\b(e[E]?(x|X)([tT])? ?(. ?)?\d{1,5})?\d | French (Standard) |
| Edit Delete | \d{3}-\d{2}-\d{4} | French (Standard) |
| Edit Delete | \b[A-Za-z0-9._%+-]+@[A-Za-z]{2,4}\b | Japanese |
| Edit Delete | (?<=[ ])(?:?\d{4})[-. ]?)?\d{4}[(. )]\b(e[E]?(x|X)([tT])? ?(. ?)?\d{1,5})?\d | Japanese |

| GEOFLUENT SELF SERVICE PORTAL | | | | | | | [Log In] |
|---|---|---|---|---|---|---|---|
| Home | Manage Tenancies | TM | Glossary | Regular Expressions | Language Technology Diagnostics | About | |

Manage Glossary

Glossary File
[        ] [Browse...] [Upload]

\* Your csv file should be in the following format.

| Pattern | Replacement | Src Language | Target Language |
|---|---|---|---|
| Lionbridge | L10Nbridge | en-US | es-ES |
| Localization | L10N | en-US | de-DE |

Glossary Items
Select Profile: [ACME CORP ▸]

| Source Term | English (US) ▸ | | |
|---|---|---|---|
| German | | | |
| Spanish (Spain) | | | |
| Chinese (PRC) | | | |

METHODS AND SYSTEMS FOR MULTI-ENGINE MACHINE TRANSLATION

CROSS REFERENCE TO RELATED APPLICATIONS

This application is a continuation of U.S. patent application Ser. No. 14/835,783, filed on Aug. 26, 2015, now granted as U.S. Pat. No. 9,747,284 and entitled "Methods and systems for multi-engine machine translation," which itself is a continuation of U.S. Non-Provisional patent application Ser. No. 13/834,331, filed on Mar. 15, 2013, now granted as U.S. Pat. No. 9,141,606, and entitled "Methods and systems for multi-engine machine translation," which itself claims priority from U.S. Provisional Patent Application Ser. No. 61/617,341, filed on Mar. 29, 2012, and entitled "Methods and systems for multi-engine machine translation," each of which is hereby incorporated by reference.

TECHNICAL FIELD

The present disclosure is directed generally to methods and systems for machine translation. More particularly, the present disclosure is directed to methods and systems for secure, accurate and customizable machine translation, cloud-based multi-engine machine translation, and machine translation as a service.

BACKGROUND

Existing machine translation systems produce translations in a variety of languages. Although many such translation systems leverage scale to provide high-quality translations, they provide only limited opportunities to customize translations or preserve customer-specific terminology and branding. Users of such systems may not be able to prevent, for example, the translation of brand names, or be able to customize the translation of difficult-to-translate phrases such as specialty terminology and idioms, that tend to be rich in metaphors and cultural nuances. As a result of these limitations, existing translation systems often produce the somewhat awkward or terminologically inaccurate translations that have come to be associated with machine translation.

Moreover, as existing translation systems are generally trained on text that is accurately spelled and grammatically sound, they are ill-equipped to translate text generated from the use of informal, real-time modes of communication such as Short Message Service (SMS) or Instant Message (IM). Consequently, when these systems encounter the inherently imprecise text resulting from such communications, they often produce translations that are replete with errors. These translation errors occur at least because machine translation systems are not presently designed to handle the use of slang, abbreviations, and non-standard punctuation, spelling, and grammar, commonly found in text resulting from real-time modes of communication.

Existing machine translation systems also present security challenges when used to translate information of a proprietary or sensitive nature. For example, by transmitting sensitive content over insecure communication channels, present systems routinely risk exposing such content to unintended parties. Some translation systems also transmit content to third-party translation providers or engines without retaining control over the provider's further use or dissemination of the transmitted content. As a result, once an end-user provides such systems with translation content that includes sensitive information such as credit card numbers, there is no guarantee that the information will not be made available to other parties or otherwise inappropriately used during or even after the end of the translation transaction.

Although some specialty translation systems attempt to provide some degree of customization and security, they nevertheless exhibit the drawbacks noted above, and are generally only able to support translation between a select few languages. Accordingly, there is a need in the art to develop machine translation methods and systems that overcome at least the above-identified limitations of prior art systems, and provide high-quality machine translations under a variety of use-conditions.

SUMMARY

The present disclosure includes exemplary methods for multi-engine machine translation. The exemplary methods involve receiving a source string for translation from an end-user application such as a real-time chat application, and identifying predefined translation data such as glossary data and user-defined regular expressions, for use in translating the source string. These methods may include normalizing the source string to address, for example, the use of abbreviations and non-standard spelling, which tend to cause translation errors. They may also include tokenizing the source string using the identified pre-defined translation data, and using one or more machine translation engines to obtain a translation of the tokenized source string.

In various embodiments, tokenizing the source string may comprise identifying one or more portions of the string as meeting search criteria specified in the predefined translation data, replacing the identified portions of the source string with unique temporary textual elements (tokens), and associating each of the tokens with target textual elements. The target textual elements may correspond, for example, to sensitive data identified in the source string for sequestration, or to custom translations specified in the pre-defined translation data.

In order to produce translations that reflect correct grammatical agreement between adjacent words and the desired translation of tokenized strings, some embodiments also conduct grammatically-sensitive tokenization. Grammatically-sensitive tokenization allows a machine translation engine to "recognize" tokens as being part of longer n-grams, and consequently allows the engine to "learn" how a given term or phrase is used in the context of adjacent words and phrases.

Grammatically-sensitive tokenization utilizes grammatically sensitive tokens. These tokens are similar to the temporary textual elements used in the basic tokenization process described above, but are "known" (e.g., through training) by one or more machine translation engines. This knowledge allows such engines to return translated text in which the grammatically sensitive token is treated as if it were a word that has certain grammatical features (e.g., gender and number).

According to many embodiments, the translation obtained as a translated string from the one or more machine translation engines retains the tokens inserted during the tokenization process. The translated string may thereafter be further processed by replacing each of the tokens in the translated string with the associated target textual element.

Normalizing the source string may include identifying one or more portions of the source string as meeting pre-defined search criteria, and replacing each of the identified portions with a corresponding normalized string. For example, a pre-defined regular expression or letter pattern may be used as a search criteria to identify all instances of the commonly-used abbreviation "brb" in the English-language source string. Thereafter, the source string may be normalized by replacing all identified incidences of "brb" with the full form, "be right back."

The present disclosure also includes exemplary systems for multi-engine machine translation. Some embodiments of these systems comprise a memory for associating a user's unique identifier with predefined translation data, and one or more processors for executing an application. The application may receive a source string for translation, and an associated user's unique identifier from an end-user application such as an instant message application. The identified may be used to identify the user's predefined translation data.

After tokenizing and perhaps normalizing the source string using the predefined translation data, exemplary systems may communicate the tokenized source string to one or more remote translator engines for translation. The engines have no knowledge of or access to the predefined translation data or any data from the source string that have, for example, been sequestered or removed from the source string during the tokenization process. Exemplary systems may thereafter obtain a translated string from the one or more remote translator engines, and further process the translated string to generate a finalized translated string for communication to the end-user application.

BRIEF DESCRIPTION OF THE DRAWINGS

Reference will now be made to exemplary embodiments, examples of which are illustrated in the accompanying drawings. Wherever possible, the same reference numbers will be used throughout the drawings to refer to the same or like parts. The drawings are not necessarily to scale.

FIG. 6 illustrates the application of an exemplary method for multi-engine machine translation.

FIGS. 7-9 illustrate aspects of an exemplary web interface disclosed herein for use in conjunction with the various disclosed embodiments.

DETAILED DESCRIPTION

Reference will now be made in detail to various exemplary embodiments, examples of which are illustrated in the accompanying drawings. Wherever possible, the same reference numbers will be used throughout the drawings to refer to the same or like parts.

Methods and systems disclosed herein have many practical applications. For example, exemplary embodiments may be used to obtain machine translations of text from remote and/or third-party translation engines, without providing the engines or any unauthorized entity access to sensitive or proprietary information that may be present in the text. The term "engine" as used herein refers to one or more software and/or firmware components and/or applications that are functionally related and/or together perform a service (e.g., translation of text).

The methods and systems described herein may also be used to customize the translation of text while utilizing the services of remote or third-party translation engines that have no knowledge of or access to the data used for the customization.

Exemplary methods and systems for multi-engine machine translation are described below in conjunction with FIGS. 1-10. Without departing from the spirit of the exemplary methods, various embodiments may be altered to delete steps, change the order of steps, and/or include additional steps. And without departing from the spirit of the exemplary systems, various embodiments may also be altered to delete and add components, and/or change the configuration of the described components.

Figure 1:
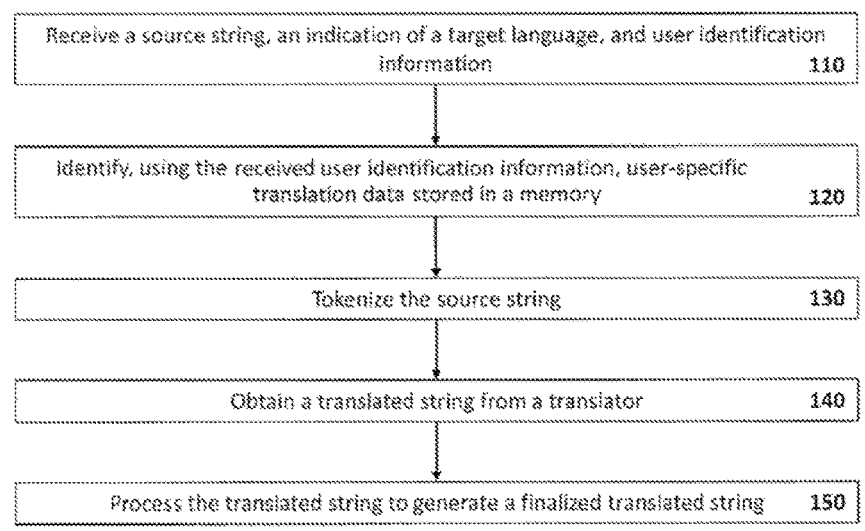
FIGS. 1-2 illustrate exemplary methods for multi-engine machine translation according to embodiments disclosed herein.

FIG. 1 is a flow chart illustrating an exemplary method 100 for improving machine translations using multiple machine translation engines. As depicted in FIG. 1, the method includes the steps of: receiving a source string for translation, an indication of a target language, and user identification information (step 110); identifying, using the received user identification information, user-specific translation data stored in a memory (step 120); tokenizing the source string (step 130); obtaining a translated string from a translator (step 140); and processing the translated string to generate a finalized translated string (step 150). The translator may be one or more third-party, proprietary, and/or remote machine translation engines or an application that interfaces with such translation engine(s).

The term "user" as used herein includes individual human users and entities such as corporations or other organizations.

In method 100, and in various embodiments described herein, the source string, the indication of the target language, and the user identification information may be received together or separately. The source string may be one or more sentences in a human language such as Spanish, and may contain various alphanumeric characters. The target language may be any human language that is different from the source language, and into which the source string is to be translated. The user identification information referred to in step 110 may be a unique identifier used to identify a particular known user, such as an individual or organization. In many embodiments, the known user is pre-registered or otherwise connected with an entity associated with the operation of the exemplary methods and systems described herein.

Further, the source string, target language, and the user identification information may be received via any type of communication link or network that allows transmission of data from one device or network component to another. A network used to receive this information may be a Local Area Network (LAN) or a Wide Area Network (WAN), and may be wireless, wired, or any combination thereof.

As previously stated, method 100 includes a step of identifying, using the received user identification information, user-specific translation data stored in a memory (step 120). The memory may be a device, tool, and/or physical media that stores information in a computer accessible form. Embodiments of such memories include various types of data management and retrieval tools such as databases and data structures, as well as storage media, including volatile and non-volatile computer memory such as SD Card, MMC Card, Mini SD, Micro SD, Internal Storage, RAM, PROM, EPROM and EEPROM, compact disks, optical disks, and magnetic tape.

User-specific translation data includes data that may be used to process the source string before and/or after it has been translated by a translator. Such data includes without limitation, glossary data, translation memory data, and source-identification rule data.

Glossary data may include, for example, a collection of words or phrases that should not be translated (referred to hereafter as do-not-translate data), and a collection of words or phrases that have corresponding pre-determined translations (referred to hereafter as specialty-translation data). Do-not-translate data that appears in the source string appears unchanged in the finalized translated string generated in step 150. Examples of such data include brand names, company names, and names of individuals. Specialty-translation data includes without limitation, terminology that is specific to a company, an industry, or a technology, and that requires translation in a very specific way to ensure, for example, consistency and clarity across languages. Examples of such data include the names of parts, processes, and interface elements. In various embodiments, glossary data is stored in a database or data structure that links at least a source word or phrase in a source language, with a target word or phrase in a target language. The target word or phrase may represent a preferred translation of the source word or phrase from the source language into the target language, or may simply be a copy of the source word or phrase.

Translation memory data is used in the translation of text that has been identified as potentially difficult to translate. Such data may include, for example, the preferred translations of a particular idiom or expression (e.g., "the straw that breaks the camel's back") from a source language into a set of target languages. In various embodiments, translation memory data is stored in a database or data structure that links at least a source word, phrase or sentence in a source language, with a target word, phrase or sentence in a target language which represents a preferred translation of the source word, phrase or sentence.

In various embodiments, translation memory data may be used to provide translations of complete sentences or translation units (e.g., a heading or other textual element that is not a complete grammatical sentence, but is nevertheless considered a whole unit for translation purposes). In such embodiments, a glossary item may be used to translate a word or phrase that is part of a longer sentence or translation unit, and that requires a special translation (e.g., a translation that differs from the translation that would otherwise be generated by the underlying third-party translation engine).

Source-identification rule data is data that may be used to identify particular portions of a source string for further processing, and may include, for example, sequestration rules and normalization rules. Sequestration rules are rules for identifying within a source string, particular types of potentially sensitive data such as customer account numbers, telephone numbers or credit card numbers, the disclosure of which may violate, for example, company regulations or policy. Normalization rules may be used to identify misspellings or commonly-used short-forms associated with particular words or phrases. Normalization rules and the process of normalization are described in greater detail in the context of FIG. 2. In some embodiments, a source-identification rule may be associated with a particular language, expressed as a regular expression, and stored in a database or a data structure in a memory. Regular expressions are well known in the art, and provide a concise means for specifying and recognizing patterns of characters in textual strings.

As illustrated, method 100 also includes the step of tokenizing the source string (step 130). In various embodiments, tokenization comprises identifying one or more portions of the source string as meeting at least one search criterion, replacing each of the identified portions in the source string with a unique temporary textual element (a token), and associating each of the temporary textual elements with a target textual element that may already be present in the user-specific translation data, or that may be securely stored as sequestered data.

The search criterion may be embodied in a literal string or a regular expression that is used to search a source string for substrings that meet the criterion. For example, the search criterion may be any phrase that starts with the word "they" and ends with the word "you." This criterion may be specified as a regular expression, which when applied to the famous lines, "First they ignore you, then they ridicule you, then they fight you, then you win," results in the following three matched substrings: they ignore you, they ridicule you, and they fight you (the identity of the source of this quote is uncertain).

The unique temporary textual elements are generated alphanumeric tokens for insertion into the source string as placeholders for corresponding portions of the source string that have, for example, been identified as private information for sequestration (e.g., an account number), or that have been identified by the user-specific translation data as requiring no translation or a particular user-specified translation.

Target textual elements that are associated with the unique temporary textual elements may correspond to data items already present in the user-specific translation data, or to sequestered portions of the source string. For example, suppose that a user's translation data contains glossary data indicating that the English phrase "hounds of midnight," when translated into German, should result in the German word "Mitternachtshunde". In such a case, if an English source string for translation into German, and associated with the user in question, contains the phrase "hounds of midnight," this phrase, when encountered in a source string, will be replaced by a temporary textual element (e.g., <PHRASE1>). This temporary textual element will also be associated in memory with the target textual element "Mitternachtshunde" during the final step of the tokenization process. As another example, if a user's name (e.g., "Mark Smith") occurs in a source string presented for translation, and the user's glossary data indicates that his name be sequestered prior to translation, the substring "Mark Smith" in the source string will be replaced by a temporary textual element (e.g., <PERSONNAME1>). This temporary textual element will be associated in memory with the target textual element "Mark Smith" during the tokenization process.

In some embodiments, when a search criterion is embodied in a literal string, and a source string is searched for substrings that match the search criterion, a substring may be identified as matching the search criterion or literal string even though their isn't an exact match. For example, the search may ignore inadvertent or semantically insignificant differences between the substring and the literal string. In many embodiments, the case of the characters in the source string may be ignored during such searches, although the case of a string used to replace a token inserted during tokenization may not be ignored. In various embodiments, the case-sensitivity of source string searches associated with glossary data or translation memory data may be presented to a user or customer as a selectable option via a user interface such as the ones described in the context of FIGS. 8 and 9.

Further, white space may be normalized when searching a source string for strings specified in glossary or translation memory data. Such normalization may allow a substring in a source string that has two or more white spaces between words (e.g., iPhone<space><space>S4) to match an otherwise identical string in the glossary or translation memory data (e.g., iPhone<space>S4). But two words in a source string (e.g., iPhone) may be prevented from matching a single word in the glossary or translation memory data (e.g., iPhone). Additionally, intra-sentence punctuation such as commas, dashes, semicolons, and points of ellipsis, which are often used inconsistently or incorrectly, may be ignored without sacrificing semantic accuracy, when searching a source string for matches against data in the glossary or translation memory.

Further, because the initial word in a sentence is conventionally capitalized in languages that use the Latin alphabet, casing of the initial word of a sentence may be ignored when matching that word or phrases beginning with that word against entries in the glossary or translation memory data. In some embodiments, such a rule may be employed regardless of whether a user prefers to generally ignore casing for source string searches against glossary and translation memory data. Moreover, regardless of the casing of a particular target/translated string in the glossary or translation memory data, if such a string is used to replace a token that begins a sentence, the first letter of the replacement string may be capitalized.

Although hyphenation can be used to indicate subtle distinctions in meaning, it is often used inaccurately or inconsistently. Accordingly, in some embodiments, hyphenation may be ignored when a source string is searched for matches against glossary or translation memory data. For example, by ignoring hyphenation, the string "single-table tournament" present as a glossary entry may match not only the substring "single-table tournament" in the source string, but also the substrings "single table tournament" and "single-table-tournament".

In various embodiments, users may be allowed to specify, by way of a user translation profile for example, that particular words or phrases in the source string be treated as do-not-translate data that should not be translated by any third-party machine translation engine being utilized for performing translations. Substrings that are part of a source string may be indicated as do-not-translate data by surrounding the substrings with predefined characters (e.g., escape characters) or changing the formatting of such substrings (e.g., via italicizing or bolding). As a result, besides explicitly identifying certain strings as do-not-translate data within a user's glossary data, or using regular expressions to identify potentially sensitive or private information, sensitive or private information may also be flagged by using special characters and/or formatting in source strings themselves. In some embodiments, mechanisms are provided for defining such special characters or formatting, associating such information with a user translation profile, and/or user-specific translation data. Users may also be able to define opening and closing do-not-translate delimiters that may act as default delimiters (e.g., { . . . } as used in the example below) to which all user-defined delimiters or flags may be required to map. To accommodate identification of do-not-translate strings in the manners indicated above, the tokenization process may involve an additional pass over the source string to identify substrings that are flagged as do-not-translate substrings using the formatting or special characters described above. Identified substrings may thereafter be handled as do-not-translate data (e.g., tokenized and not provided to a third-party translation engine). However, any such formatting or flagging with special characters may be removed from the final translated string.

Example: User-Defined Mark-Up or Formatting to Indicate do-not-Translate Data: A user whose primary application submits text in HTML indicates in their translation profile that all items that are marked as bold and italic (e.g., <b><i> . . . </i></b>) should be treated as do-not-translate data items. Thereafter, a translation is requested for the following input text: Press <b><i>Enter</i></b> to continue. In many embodiments, the user defined do-not-translate mark-up may thereafter be placed within default or user-defined escape characters yielding: Press {<b><i>Enter<i></b>} to continue. During tokenization, the text delimited by the escape characters (e.g., { . . . }) are searched for and replaced with a uniquely identifiable token, yielding the tokenized string: Press GL12345678 to continue. The text delimited by the escape characters is then saved to memory as a do-not-translate data item associated with the user's glossary data, and the tokenization, translation and post-translation processing proceeds as usual.

Using one or more user-interface tools, a user may be able to indicate do-not-translate items with ease. For example, a user may simply right-click on portion of text to indicate the presence of do-not-translate items.

In some embodiments, in order to simplify and/or improve the sequestration of private data, all numeric strings in the source string may be replaced with tokens that consist of a randomized number of a standardized length that is unique to the particular translation request associated with the source string. Tokenizing all numerical strings in this way may avoid the need to create and execute multiple computationally expensive regular expressions, and may more reliably sequester and preserve the integrity of private data. Additionally, using a uniquely identifying number as part of a token may allow reliable replacement of the original sequestered string associated with the token, even if the order in which the token appears in the translated string has changed. However, generating a unique number and appending the number to the randomized number may be unnecessary in some embodiments if the randomized number itself represents a unique token for the translation task at hand. Further, tokens that consist of a randomized number potentially add an additional level of security against unauthorized mining of source string data for potentially private data.

Example: Data Sequestration Using Randomized Numbers: In this example, let us assume that for a given source string, all numerical strings are identified. Identified numerical strings may include, for example, decimals, dashes and parentheses. In this example, let us also assume that the source string is: Mi numero de telefono es (617) 555-5555, y el numero de mi Visa es 1234-5678-1234-5678. For each numerical string identified in the source string, the following acts are performed. A unique numerical identifier of a normalized length (e.g., three digits) is created (e.g., 100 for the string (617) 555-5555, and 101 for the string 1234-5678-1234-5678). Additionally, a randomized numerical string (e.g., 93847 for the string (617) 555-5555 and 28374 for the string 1234-5678-1234-5678) is created that is also of a normalized length (e.g., five digits). Next, the randomized string is appended to the numerical identifier to form the token used for tokenization (e.g., 10093847 and 10128374 respectively). Using a token of normalized length provides additional security by masking the length of the underlying sequestered string. The identified numerical string is thereafter replaced with the formed token, and an association between the formed token and the identified numerical string is stored in memory. In this example, the tokenized string is: Mi numero de telefono es 10093847, y el numero de mi Visa es 10128374. After the tokenization is completed, the tokenized string may be sent to a third-party translation engine for translation. Upon receipt of a translated string corresponding to the tokenized string, each inserted token is identified and replaced with its associated numerical string. For example, the returned translated string comprising the tokens inserted during tokenization may be: My phone number is 10093847, and my Visa number is 101128374. The final translated string may therefore be: My phone number is (617) 555-5555, and my Visa number is 1234-5678-1234-5678.

As illustrated, method 100 also includes the step of obtaining a translated string from a translator (step 140). The translator receives the tokenized source string for translation, but cannot access without permission, the user-specific translation data or any data sequestered from the tokenized source string. The translator may also utilize, to whatever extent necessary, the services of a human translator. According to many embodiments, the translated string not only contains at least a partial translation of the tokenized source string, but also contains each of the unique temporary textual elements that were present in the tokenized source string prior to the translator's translation of the tokenized source string.

Method 100 also includes the step of processing the translated string obtained from the translator to generate a finalized translated string (step 150). Processing the translated string may, in various embodiments, comprise replacing each unique temporary textual element found in the translated string with an associated target textual element. In a previous example, the temporary textual element, <PERSONNAME1>, was inserted into a source string in place of the sequestered string "Mark Smith" during the tokenization process to yield a tokenized source string. Continuing on with this example, we note that a translated string corresponding to this tokenized source string, and generated by a third-party translator engine or application will also contain the placeholder temporary textual element, <PERSONNAME1>. The temporary textual element remains unchanged in the translated string because the temporary textual element is unknown to the translator and is therefore reliably retained in the translated string or because the formatting of the element may indicate to the translator that the element is not to be translated. In this example, processing the translated string to generate a finalized translated string involves replacing the temporary textual element, <PERSONNAME1>, with the sequestered string "Mark Smith."

Grammatically-Sensitive Tokenization

Grammatical agreement generally refers to the way a word in a sentence changes, or inflects, to reflect the grammatical features of a related word in the same sentence. When the form of one word correctly matches the grammatical features of a related word, the two words are said to be in agreement. In English, for example, the sentence, I bought a books, sounds very wrong because the singular determiner a is not in agreement with the plural noun books. Grammatical features that are commonly reflected by agreement are person (e.g., first, second, and third), number (e.g., singular and plural), and case (e.g., nominative and accusative).

In the examples below, for instance, the change of the English word book from singular to plural requires changes not only in the translation of the word book in Spanish, French and German, but also to the equivalents of the article the and the adjective red.

| English: | the red book | the red books |
|---|---|---|
| Spanish: | el libra rojo | los libros rojos |
| French: | le livre rouge | les livres rouges |
| German: | ein rotes Buch | die rote Bucher |

In many human languages, agreement is critical to an unambiguous understanding of a sentence. Grammatically-sensitive tokenization allows a user to not only preserve custom terminology during translation, but also have grammatical agreement between a translated word and adjacent words in the sentence.

The basic tokenization discussed previously in the context of FIG. 1 may replace, for example, a substring in a source string that matches a string in glossary data, with a token that is unknown to a machine translation engine used to perform a translation of the source string. The token may be unchanged during the translation process, and may later be replaced by a custom-translated string from the glossary. In grammatically-sensitive tokenization, the machine translation engine may be "trained" to recognize a series of tokens within a natural language context. A machine translation system that allows grammatically-sensitive tokenization may therefore include such tokens in n-gram analyses of bilingual and monolingual training material, and may "recognize" such tokens as words in the source and target languages just as they recognize and handle any other words.

During grammatically-sensitive tokenization for example, a source language glossary data entry identified in a source string may be replaced with a token that shares the same relevant grammatical properties as the corresponding target language glossary data entry. The token may be "recognized" by the machine translation system, and be consistently translated by the system regardless of context. Accordingly, grammatically-sensitive tokenization facilitates the appropriate translation of a glossary term present in a source string by replacing the term in the source string with a grammatically-sensitive token that is, for example, both part of a machine translation engine's statistical models and translated both consistently and grammatically correctly by the machine translation engine. Thereafter, the translation system searches the translated string returned from the machine translation engine for the grammatically-sensitive token, and replaces the token with associated data such as a desired or custom translation as specified in the glossary.

A first type of grammatically-sensitive tokenization may involve training machine translation engines on prepared training materials, and adding grammatically flagged tokens to a machine translation engine's statistical models such that non-word tokens (e.g., GL101111) are recognized by the engine as a lexical item that tends to occur in particular grammatical contexts.

A second type of grammatically-sensitive tokenization may involve using token words that share some relevant grammatical characteristics with a glossary data item for which a translation could be reliably predicted. In this type of tokenization, the source-language words that are used as grammatically-sensitive tokens may need to be chosen carefully. In some embodiments, it may be preferable if (1) the token words occur frequently enough in common usage to be adequately modeled by a machine translation engine, and (2) are rare enough so that the risk of replacing a non-token use of the word with a target word or phrase is a translated string is not too high. In various embodiments, multiple token candidates for each grammatical flag are identified and the first such candidate is used as the grammatically-sensitive token, unless that particular candidate string already appears in the source string, in which case the second such candidate is considered. If all candidate tokens already appear in the source text, the basic tokenization process is resorted to.

Grammatically-sensitive tokenization may be implemented by associating grammatically-sensitive token data with user-specific translation data stored in memory. The grammatically-sensitive token data may be stored, for example, in a database table, where each record is associated with the following information: a grammatical flag, a machine translation engine designation, and a collection of grammatically-sensitive tokens. In some embodiments, such a table would be accessible only to linguistic or other administrators with authority to edit the database. A user-interface may be provided to allow such persons to add to, delete from, or otherwise modify records in the table. Additionally, glossary data items may be associated with an optional grammatical flag that signifies grammatical properties of a target string.

Figure 2:
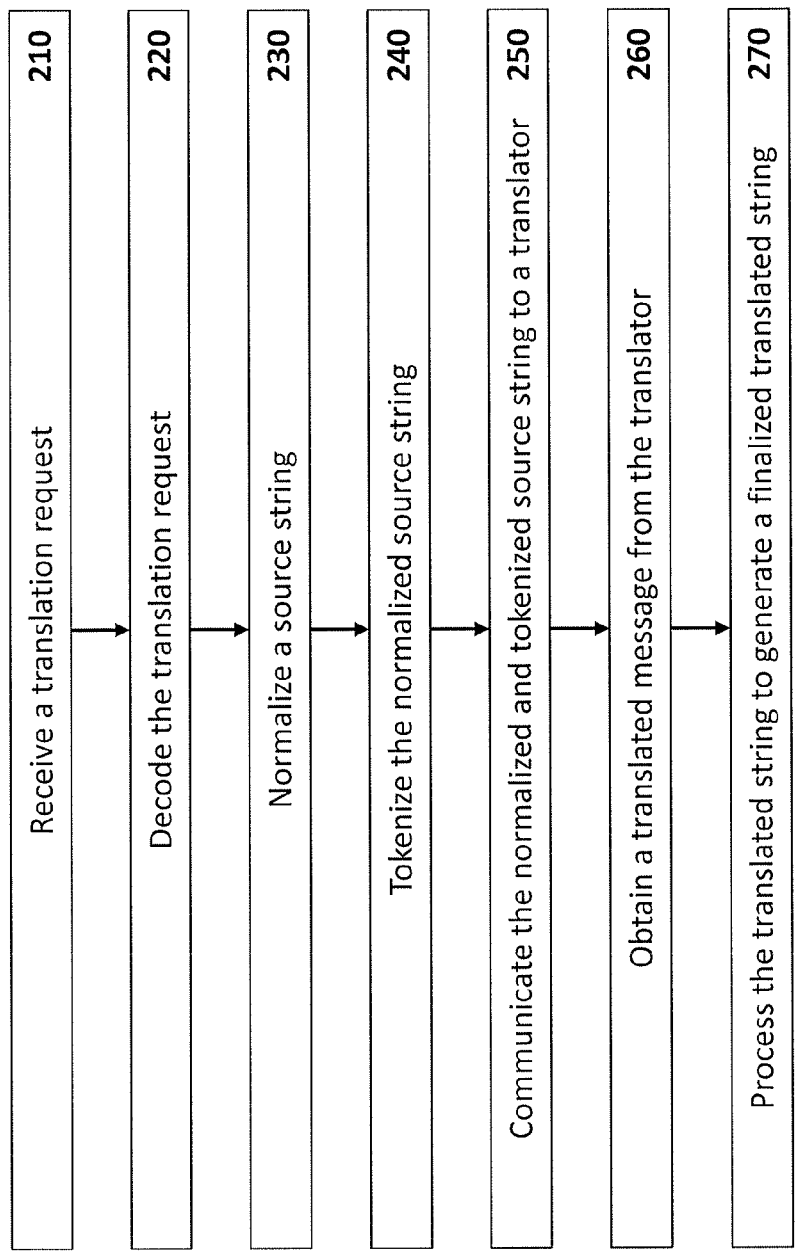

FIG. 2 is a flow chart illustrating an exemplary method 200 for improving machine translations using multiple translation engines. Method 200 includes the steps of: receiving a translation request (step 210), decoding the translation request (step 220), normalizing a source string (step 230), tokenizing the normalized source string (step 240), communicating the normalized and tokenized source string to a translator (step 250), obtaining a translated message from the translator (step 260), and processing the translated string obtained from the translator to generate a finalized translated string (step 270).

In various embodiments, the translation request received in step 210 includes user identification information, a source string for translation, an indication of the language of the source string (e.g., a source language), and an indication of a target language into which the source string is to be translated. The source string may be any character string and the user identification information may be any type of identification information previously discussed in the context of method 100. And the translation request may be received via any type of network or communication link also discussed in the context of method 100.

Decoding the translation request (step 220) comprises using the received user identification information to identify at least one memory comprising user-specific translation data. In this step, a user may also be authenticated using, for example, the received user identification information. When authentication is successful, the translation process progresses to step 230; on failure an error message may be returned to the application from which the translation request is received.

In addition to comprising glossary data, translation memory data, and/or source-identification rule data, user-specific translation data may also comprise normalization data. Normalization data includes, for example, commonly misspelled words and corresponding corrected versions, commonly-used word/phrase short-forms and their corresponding full-forms, and regular expressions for identifying non-standard text such as slang, common misspellings, common abbreviations, and common grammatical errors.

Decoding the translation request in step 220 may also involve determining whether the source string of the translation request exceeds a character limit. In many embodiments, however, such a determination may be made, and steps to enforce the character limit may be taken before the decoding step 220, by the application generating the translation request. The character limit may be imposed, for example, by a third-party translation engine utilized for responding to the translation request. If the source string exceeds the character limit, the source string may be broken into two or more strings. This may be accomplished by identifying a terminal punctuation mark or other sentence marker in the source string that appears closest to, but not after, the character that causes the source string to reach the character limit.

For example, if the character limit is 2,000 characters, and a source string has 2,200 characters, then in step 220, the source string may be searched backwards from the $2,000^{th}$ character until a period, a question mark, an exclamation point, a colon, or a paragraph break is found. The source string may thereafter be broken into source string 1 and source string 2, and each may separately be processed using steps 230-260, before translated strings associated with each of source strings 1 and 2 are combined in step 270.

In step 230, the source string is normalized. Normalization, as used herein, refers to the manipulation of text to make it better conform to language-specific standards of grammar, spelling and punctuation. When translated using a machine translation system, normalized text is more likely to yield accurate translations. And when performed before the tokenizing process, normalization is more likely to result in better translation customization, particularly if the regular expressions or literal strings used to identify substrings for tokenization expect the use of standard punctuation, spelling and/or grammar.

The normalization in step 230 involves identifying one or more portions of the source string as meeting a language-specific search criterion, and replacing each of the identified portions of the source string with a corresponding normalized string specified in the user-specific translation data. For example, the substrings "luv" and "4ever" included in the source string "luv you 4ever" may be identified for normalization, and thereafter replaced by corresponding corrected versions, "love" and "forever" to yield the normalized source string "love you forever."

The process of tokenization as explained in the context of FIG. 1, involves removing an element from the source string and replacing it with a temporary textual element (token) that will not be recognized by a machine translation engine as a word requiring translation. As previously stated, tokenization generally requires further processing following the receipt of a translated string from a machine translation engine—any temporary textual elements inserted during tokenization are replaced with corresponding substrings that contain, for example, sequestered material or customized translations of particular words/phrases. By contrast, the process of normalization does not require any processing following the translation of the normalized string by a machine translation engine.

Further, to identify a candidate portion of the source string for normalization, the source string may be searched using a predefined string (e.g., "4ever") or a regular expression. In some embodiments, a predefined string will match a substring in the source string when the substring (1) begins the source string and is followed by a white space; (2) is preceded and followed by a white space; (3) is preceded by a white space and is followed by sentence punctuation; or (4) is preceded by a white space and is the last element of the source string. For source languages whose writing systems do not conventionally use a white space to delimit words, language-appropriate strategies are applied for searching the source string for predetermined normalization strings or regular expressions.

Tokenizing the normalized source string (step 240 of method 200) may be performed as described in the context of step 130 of FIG. 1, the notable difference being that in the tokenization step 130 of FIG. 1, the source string was not necessarily normalized prior to being tokenized. In various embodiments, normalization may occur after tokenization has been performed.

The normalized and tokenized source string may be communicated to a translator (step 250 of method 200) via any network or type of communication link described above in the context of FIG. 1. And the steps of obtaining a translated message from the translator (step 260), and processing the translated string obtained from the translator to generate a finalized translated string (step 270) may be performed as described in connection with steps 140 and 150 respectively, of FIG. 1.

Figure 10:
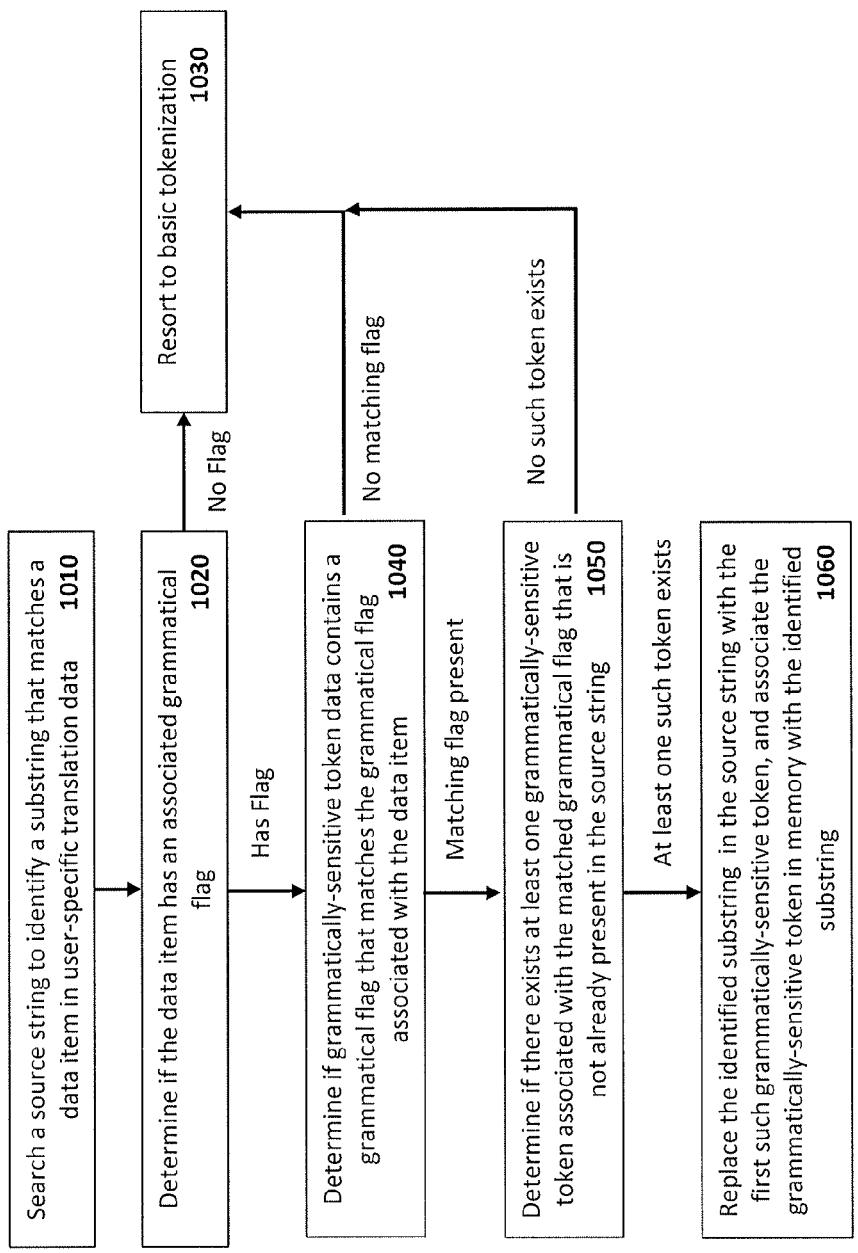
FIG. 10 illustrates an exemplary method related to grammatically-sensitive tokenization according to embodiments disclosed herein.

FIG. 10 depicts an exemplary method 1000 for determining whether application of grammatically-sensitive tokenization or alternatively basic tokenization, as discussed in the context of FIG. 1, is appropriate under certain conditions. In various exemplary embodiments, after a translation request comprising user identification information is received, user-specific translation data associated with the translation request is identified. Assuming relevant user-specific translation data is identified, the steps of method 1000 may be executed as follows.

In step 1010, a source string associated with the translation request is searched to identify a substring that matches a data item in the user-specific translation data. Step 1020 involves a determination as to whether or not the data item has an associated grammatical flag. If no grammatical flag is found to be associated with the data item, the substring matching the data item is handled in accordance with the basic tokenization process discussed, for example, in the context of FIG. 1 (step 1030). On the other hand, if a grammatical flag is found to be associated with the data item, then in accordance with step 1040, a determination is made as to whether grammatically-sensitive token data associated with the user-specific translation data contains a grammatical flag that matches the grammatical flag associated with the data item. If no matching flag is found, then the substring matching the data item is handled in accordance with the basic tokenization process (step 1030). If a matching flag is found, then a determination is made as to whether or not there exists at least one grammatically-sensitive token associated with the matched grammatical flag, where such token is not already present in the source string (step 1050). If it is determined that no such token exists, then the substring matching the data item is handled in accordance with the basic tokenization process (step 1030). If it is determined that at least one such token exists, then grammatically-sensitive tokenization is performed, where the identified substring in the source string is replaced with the first such grammatically-sensitive token, and the replaced substring is associated with the grammatically-sensitive token in a memory (step 1060).

In many embodiments, after a translated string is returned from a machine translator, the translated string is searched in order to identify grammatically-sensitive tokens. For each such token that is found, the token is replaced in the translated string with an associated target string associated in memory with the grammatically-sensitive token. In such embodiments, a search for basic tokens used in the basic tokenization approach described, for example, in the context of FIG. 1, and the task of replacing such basic tokens in the translated string is performed after all grammatically-sensitive tokens identified in the translated string have been dealt with.

Grammatical Flags

An extensible method for encoding grammatical attributes in a string of digits (a grammatical flag) is described below. Grammatical flags allow grammatical attributes of words and phrases to be compared efficiently. In some embodiments, grammatical flags may support only a single part of speech (e.g., nouns) and may only have three associated grammatical attributes (e.g., part of speech, gender and number). In other embodiments, grammatical flags may provide support for additional parts of speech and be associated with richer and more numerous grammatical attributes which provide the potential for broader grammatical agreement.

Grammatical flags may be several digits long (e.g., three digits) where the digits represent, for example, a part of speech (e.g., noun), a gender (e.g., feminine or masculine), and a number (e.g., singular or plural). User-specific translation data may contain one or more database tables for specifying grammatical flags. The following table indicates exemplary values that may be associated with three digits of grammatical flags.

| Parameter | Descriptor | Value | Meaning |
| --- | --- | --- | --- |
| First digit | Part of Speech | 1 | Noun |
| Second digit | Gender | 0 | Gender is not relevant for this language |
| Second digit | Gender | 1 | Masculine |
| Second digit | Gender | 2 | Feminine |
| Second digit | Gender | 3 | Neuter |
| Second digit | Gender | 4 | Other (e.g., Dutch Common) |
| Third digit | Number | 0 | |
| Third digit | Number | 1 | Singular |
| Third digit | Number | 2 | Plural |
| Third digit | Number | 3 | Uncountable (singular notion) |
| Third digit | Number | 4 | Uncountable (plural notion) |

In the grammatically-sensitive tokenization example presented below, a grammatical flag is associated with the glossary data entry that links the source term "motherboard" in English with the Spanish target term "placa madre." This grammatical flag (and an associated token) may be encoded as follows. The grammatical flag associated with the glossary data entry indicates that the desired translation ("placa madre") is a noun, is feminine, and is singular. Based on the exemplary values displayed in the table above, the grammatical flag associated with "placa madre" may be the string 121. This grammatical flag may then be appended to a token prefix, such as "GFTK", to yield the token GFTK121.

Example of Grammatically-Sensitive Tokenization

The following example illustrates grammatically-sensitive tokenization using an English to Spanish translation of the source string "I need a new motherboard." Exemplary glossary data and grammatically-sensitive token data that are utilized are shown below:

Glossary Data:

| Source Term | Target Term | Source Language | Target language | Grammatical Flag |
| --- | --- | --- | --- | --- |
| Motherboard | placa madre | English-US | Spanish | Noun, Feminine, Singular |

Grammatically-Sensitive Token Data:

| Substitute Source Term | Expected Translation | Machine Translation Engine | Grammatical Flag |
| --- | --- | --- | --- |
| GFTK121 | GFTK121 | MT Engine #2 | Noun, Feminine, Singular |

In a machine translation performed without any tokenization, the source string is forwarded to a machine translation engine or system after it is received, without any portions of the source string being replaced by tokens. If only basic tokenization is performed, then a search of the source string results in the substring "motherboard" being identified, and this substring is thereafter replaced with a neutral token such as GLSRDHDItAZ. If grammatically-sensitive tokenization is performed, then a search of the source string results in the substring "motherboard" being identified, and this substring is thereafter replaced with the grammatically-sensitive token GFTK121.

With no tokenization, the translated string returned from the machine translation engine utilized for the translation may be the string, "Necesito una motherboard nueva". Since no tokens were inserted, the final translated string will also be the same string as indicated above. Accordingly, with no tokenization, there is the risk of arriving at a translation that has correct grammar but an incorrectly translated term. In this case, the user would have wanted motherboard to translate to placa madre per the user's glossary data, but without tokenization, the specialty translation was missed.

Using basic tokenization (as described in the context of FIG. 1, for example), the translated string may be, "Necesito un nuevo GLSRDHDItAZ". This translated string may then yield the final translated string, "Necesito un nuevo placa madre" after the token GLSRDHDItAZ is replaced with the glossary term placa madre. This translation uses the correct/desired translation for the term motherboard in accordance with the user's glossary data, but contains imperfect grammar because the indefinite article and adjective are masculine and do not agree with the gender of the translated term placa madre.

Using grammatically-sensitive tokenization, the translated string may be, for example, "Necesito una GFTK121 nueva." This results in the final translated string, "Necesito una placa madre nueva" after the token GFTK121 is replaced with the associated glossary term place madre. This translated string not only uses the correct/desired translation for the term motherboard in accordance with the user's glossary data, but also has perfect grammar because the indefinite article and adjective are both feminine and in agreement with the gender of the translated term place madre. Moreover, the word order is also correct.

Grammatically-Sensitive Tokens and Verb Arguments

The meaning of a verb in a given sentence, and therefore its translation, is often determined by "grammatical arguments" in that sentence. These arguments may be other words in the sentence that have a bearing on the verb. While there may be several possible arguments, the ones that present the biggest challenge to successful tokenization are the subject of the verb or the thing that acts ("Arg 1"), and the direct object of the verb, or the thing that is acted upon ("Arg2").

In the example below, the three English sentences are identical but for one word, which in this case is the direct object of the verb run. The three Spanish and German translations of the word run are, however, all different.

| English | Spanish | German |
| --- | --- | --- |
| My brother runs the company. | Mi hermano dirige la compania. | Mein bruder leitet die firma. |
| My brother runs the machinery. | Mi hermano opera la maquinaria. | Mein bruder betreibt die maschinen. |
| My brother runs the race. | Mi hermano corre la carrera. | Mein bruder lauft die meilenrennen. |

In each case, the meaning of the verb run changes because of the nature of the direct object (the value of Arg2). In the first sentence, runs means manages or leads because it has as its direct object a word that signifies an organization. In the second sentence, runs means operates because it has as its direct object a word that signifies a devise. And in the third sentence, runs means races because it is followed by a word that signifies a foot race.

Accurate translation is often based on the meaning of words in the context of their use. Therefore, the fact that run means different things in these sentences indicates that it may be translated into a given target language with different words, as is the case with the above translations into Spanish and German.

Grammatically-sensitive tokenization may solve or at least mitigate such problems if, for example, grammatical flags encode semantic categories which allow a machine translation system to choose more appropriate grammatically-sensitive tokens that are flagged with richer semantic attributes indicative of such traits as human-ness, or animate-ness.

Exemplary Practices—Handling Many-to-One Mappings: In some embodiments, when translating from certain source languages to certain target languages (e.g., from Russian to English), multiple source terms in a glossary or translation memory, each with a slightly different grammatical ending, may reasonably translate to the same target term. Some embodiments may address such a scenario by ensuring that each source term is entered as a separate glossary or translation memory entry and mapped to the same target translation. Other embodiments may address this scenario by defining and using one or more regular expressions to capture (1) the root of the multiple related source terms, and/or (2) the ending variations. All identified substrings matching such regular expressions may then be mapped to the same target translation.

Figure 3:
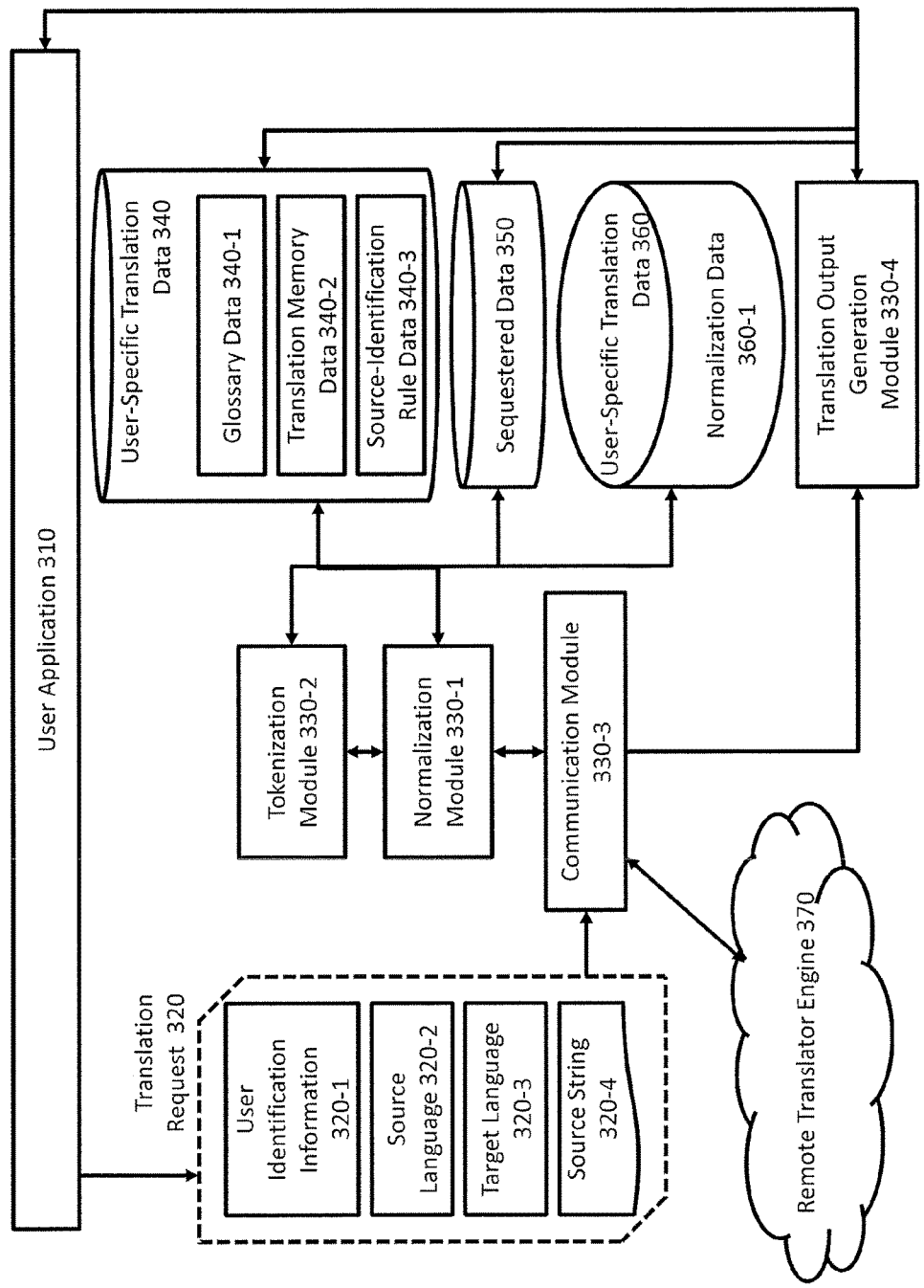
FIGS. 3-5 illustrate exemplary systems for multi-engine machine translation according to various embodiments disclosed herein.

FIG. 3 illustrates a system 300 for improving machine translations using multiple machine translation engines. System 300 comprises user application 310, translation request 320, normalization module 330-1, tokenization module 330-2, communication module 330-3, translation output generation module 330-4, user-specific translation data 340, sequestered data 350, user-specific translation data 360, and remote translator engine 370.

A module, as used herein, refers broadly to a software, hardware or firmware component. For example, a software module may be executable computer code that is part of a larger application, and that exchanges data with other software applications and/or other modules within the same application.

User application 310 may be any type of software application that allows a user to generate textual input suitable for translation. For example, user application 310 may be a web-based customer support application with a graphical user interface that allows customers of an organization to input comments or concerns in a variety of languages. The user application may also allow users to dictate comments using their voice, and thereafter convert the comments to a textual string suitable for translation. Non-limiting examples of user application 310 include TransWidget®, TextControl®, Sametime®, Live Person® chat, or any application that utilizes the GeoFluent® Controlled Application Programming Interface (API). In various embodiments of system 300, user application 310 seamlessly interfaces with the other components of system 300 and exchanges information with one or more of these components without requiring any modifications. This may be accomplished by having one or more of the other components of system 300 implement an API provided by user application 310.

Translation request 320 is a software object or any data structure or construct suitable for transferring information between applications executing on the same or different processors. In the embodiment of system 300, translation request 320 comprises the following information: user identification information 320-1, source language 320-2, target language 320-3, and source string 320-4.

User identification information 320-1 may be any type of identification information described in the context of FIG. 1. Source language 320-2 is an indication of a language that source string 320-4 is presently associated with, and therefore the starting point of any translation of source string 320-4. Target language 320-3 is an indication of a language that source string 320-4 should be translated to, and therefore an end point of a translation of source string 320-4. Source string 320-4 may be any type of character string described in the context of FIG. 1.

In some embodiments, communication module 330-3 may be a stand-alone application executing on one or more processors. In other embodiments, it may be part of an application that executes other components of system 300, such as tokenization module 330-2 and normalization module 330-1. In system 300, communication module 330-3 is communicatively linked via the depicted links to normalization module 330-1, tokenization module 330-2, translation output generation module 330-4, and remote translator engine 370. The links represent any type of communication link discussed in the context of FIG. 1. Although communication module 330-3, normalization module 330-1, tokenization module 330-2 and translation output generation module 330-4 may execute on processors located remotely from each other, they are implemented to work in conjunction with each other and with remote translator engine 370, such that they together produce translations of a higher quality than translations produced by remote translation engine 370 alone. These modules also work in conjunction with one another to protecting a user's private data from exposure to remote translator engine 370.

Communication Module 330-3 receives translation request 320 from user application 310. There are a variety of techniques known in the art (e.g., inter-process communication techniques) using which software applications may communicate data to one another; any of these techniques may be used to communicate translation request 320 from user application 310 to communication module 330-3. In some embodiments, communication module 330-3 may actively obtain translation request 320 from user-application 310, while in others communication module 330-3 may receive translation request 320 after user application 310 transmits translation request 320 to communication module 330-3. In various embodiments, user application 310 may not be aware of the existence of communication module 330-3, and may simply insert translation request 320 into a queue accessible to communication module 330-3 when translation request 320 is ready for use. In such situations, communication module 330-3 may routinely poll the queue and obtain a copy of translation request 320 after it is available. Alternatively, user application 310 may directly transmit the translation request 320 to communication module 330-3. Further, communication module 330-3 may implement and/or make available one or more APIs that allow one or more applications (e.g., user application 310, normalization module 330-1 or remote translator engine 370) to communicate and/or exchange data with itself.

In various embodiments of system 300, communication module 330-3 communicates translation request 320 to the normalization module 330-1 for normalization. In other embodiments, normalization module 330-1 may receive translation request 320 directly from user application 310.

Normalization module 330-1 receives the translation request 320 and performs normalization as described, for example, in the context of FIG. 2. A normalized string generated as a result of the normalization process is then received by tokenization module 330-2 and tokenized as described, for example, in the context of FIG. 1. Normalization module 330-1 and tokenization module 330-2 may be stand-alone applications executing on one or more processors that are communicatively linked via the depicted links to each other, to communication module 330-3, and to one or more memories that store the depicted user-specific translation data 340, sequestered data 350, and user-specific translation data 360. The links represent any type of communication link discussed in the context of FIG. 1.

User-specific translation data 340 and 360 are stored in any type of memory discussed in the context of FIG. 1. The user identification information 320-1 may be associated with, and used to identify user-specific translation data 340 and user-specific translation data 360 for use by normalization module 330-1 during for the normalization process, tokenization module 330-2 for the tokenization process, and translation output generation module 330-4 for post-translation processing.

User-specific translation data 340 includes glossary data 340-1, translation memory data 340-2, and source-identification rule data 340-3, which may be any type of glossary data, translation memory data, and source-identification rule data, respectively, that were previously discussed in the context of FIG. 1.

In some embodiments, normalization module 330-1 uses the user-identification information 320-1 to access normalization data 360-1 stored, for example, in a database or data structure. Normalization data 360-1 may associate one or more terms or phrases for normalization in a particular language, with a corresponding normalized word or phrase in the same language. Normalization data 360-1 may also include one or more normalization rules in the form of regular expressions.

Normalization module 330-1 searches source string 320-4 for one or more words or phrases for normalization stored as part of normalization data 360-1. Alternatively and/or additionally, normalization module 330-1 may search source string 320-4 using one or more regular expressions identified by normalization data 360-1, to identify one or more terms or phrases for normalization. Each such regular expression may also be associated with a corresponding normalized word or phrase.

Once normalization module 330-1 has identified one or more words or phrases for normalization in source string 320-4, the identified words or phrases are replaced in the source string 320-4 with corresponding normalized words or phrases from normalization data 360-1.

As a non-limiting example, if source string 320-4 were the English language string "I'll brb," and normalization data 360-1 included the term for normalization, "brb," associated with the normalized phrase "be right back," the substring "brb" in the source string 320-4 would be identified for normalization by normalization module 330-1. Normalization module 330-1 would then replace the sub-string "brb" with the corresponding normalized phrase "be right back" to yield a normalized source string "I'll be right back."

In various embodiments of system 300, tokenization module 330-2 receives or retrieves a normalized source string from the normalization module 330-1 through the depicted link, and uses user-specific translation data 340 to tokenize the normalized source string. According to some embodiments, tokenization module 330-2 uses user-identification information 320-1 to identify user-specific translation data 340 as a source for translation data associated with translation request 320. In other embodiments, normalization module 330-1 or communication module 330-3 may share information identifying user-specific translation data 340 with tokenization module 330-2.

Tokenization module 330-2 thereafter identifies one or more portions of the normalized source string as meeting at least one search criterion. The at least one search criterion may be reflected in a literal string present in glossary data 340-1, or translation memory data 340-2, or a regular expression present in source-identification rule data 340-3. Tokenization module 330-2 then replaces each of the identified portions in the source string with unique temporary textual elements (tokens), and associates each of the temporary textual elements with a corresponding target textual element that is already present in glossary data 340-1 or translation memory data 340-2, or that corresponds to a portion of the normalized source string saved in memory as part of sequestered data 350.

The following is a non-limiting example of tokenization as performed in system 300. Suppose that a normalized string received by tokenization module 330-2 is the string, "My name is Jane. I've been a customer of Oracle for six years." A regular expression stored in source-identification rule data 340-3 identifies the substring "Jane" as private data for sequestration as part of sequestered data 350. Accordingly, a copy of the substring "Jane" is associated with a unique textual element, for example, <CUSTOMERNAME1> and stored, along with the associated textual element in a database housing sequestered data 350. The identified substring, "Jane" is also replaced in the string being tokenized with the textual element <CUSTOMERNAME1>. Further, the substring "Oracle" is identified using glossary data 340-1 as a word that should not be translated. Accordingly, tokenization module 330-2 replaces the substring "Oracle" with the unique textual element "<COMPANYNAME1>" and stores an association in a memory between the textual element <COMPANYNAME1> and the item in glossary data 340-1 used to identify the substring "Oracle". The tokenized string generated by tokenization module 330-2 in this example would be "My name is <CUSTOMERNAME1>. I've been a customer of <COMPANYNAME1> for six years."

As explained in the context of FIG. 1, the unique temporary textual elements may be alphanumeric tokens inserted into source strings as placeholders prior to translation by a third-party translation engine or application. These placeholders may be linked in memory to private information for sequestration, to particular predetermined translated words or phrases to allow for custom translations, or to words or phrases that require no translation.

After source string 320-4 has been normalized and tokenized, communication module 330-3 receives or retrieves the tokenized source string and transmits it to remote translator engine 370. Remote Translator Engine 370 is any type of translator discussed in the context to FIG. 1. In other embodiments, tokenization module 330-2 directly communicates the tokenized string to the remote translator engine 370.

As depicted in the FIG. 3, communication module 330-3 receives or retrieves a translation of the tokenized source string from remote translator engine 370, and communicates the translated string to translation output generation module 330-4. In other embodiments, module 330-4 receives or retrieves the translated string directly from remote translator engine 370.

Once translation output generation module 330-4 has access to the translated string, it processes the translated string to generate a finalized translated string. The process of generating the finalized translated string may, in various embodiments, comprise replacing each unique temporary textual element found in the translated string with an associated target textual element from glossary data 340-1, translation memory data 340-2 and/or sequestered data 350. After the finalized translated string is generated, module 330-4 makes it available to user application 310. In some embodiments, module 330-4 makes the finalized translated string available to communication module 330-3, which in turn sends or otherwise makes available to user application 310, the finalized translated string.

Continuing the non-limiting example presented above, a Spanish translation of the tokenized source string returned from remote translator engine 370 may be the string, "Me llamo <CUSTOMERNAME1>. He sido un cliente de<COMPANYNAME1> durante seis anos." Upon gaining access to this translated string, translation output generation module 330-4 may access sequestered data 350 to retrieve the target textual element associated with the unique textual element <CUSTOMERNAME1>. For example, an entry in a database table stored in memory and associated with sequestered data 350 may link <CUSTOMERNAME1> with the name "Jane." This entry may have been created by tokenization module 330-2 during the tokenization process. Module 330-4 may also access another memory, associated with user identification information 320-1 to locate and retrieve an entry in glossary data 340-1 previously associated with <COMPANYNAME1>. Module 330-4 may then replace the textual element <COMPANYNAME1> with the associated glossary entry. Accordingly, the finalized translated string produced by module 330-4 may be, "Me llamo Jane. He sido un cliente de Oracle durante seis anos."

Figure 4:
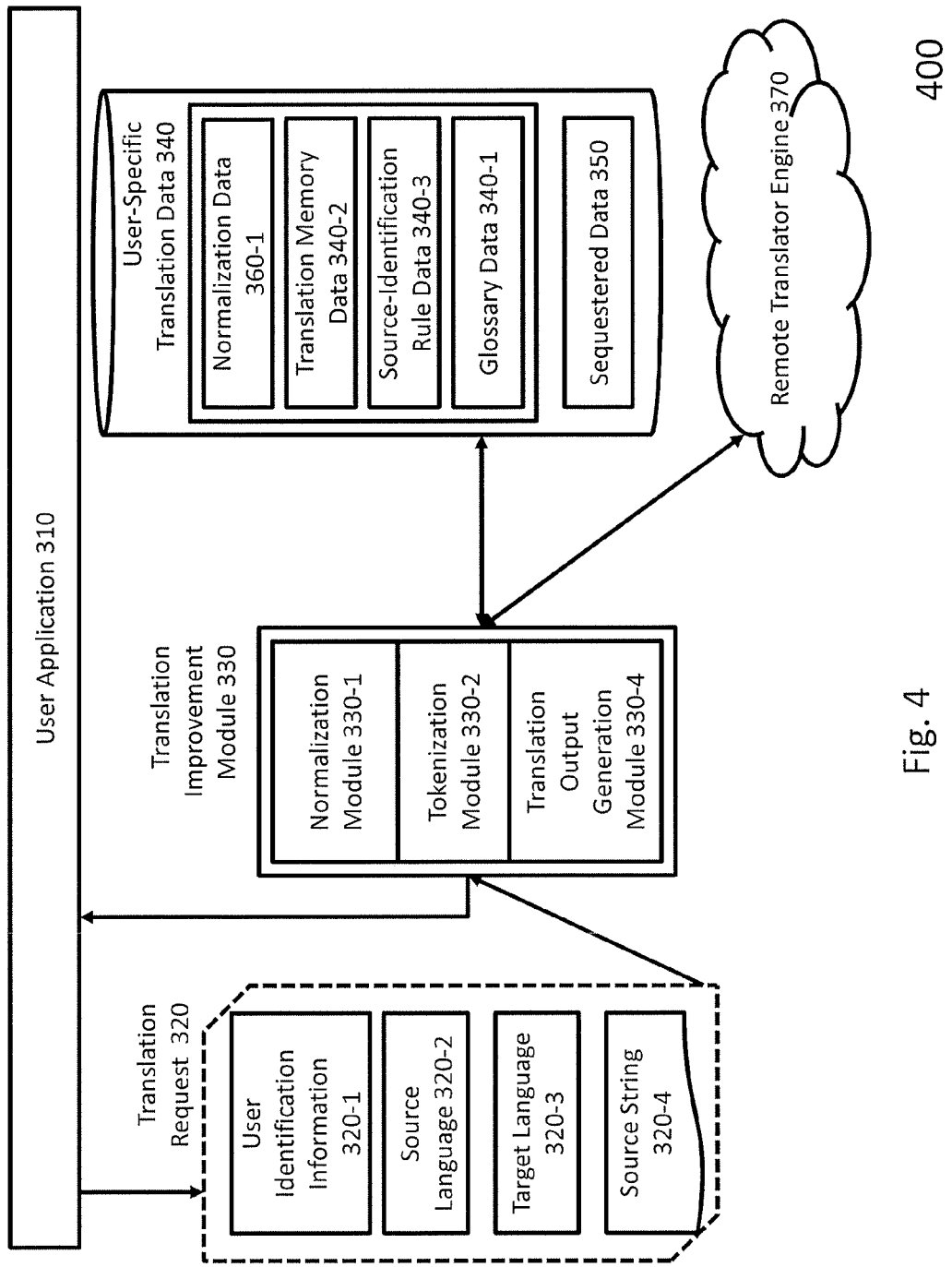

FIG. 4 illustrates a system 400 for improving machine translations using multiple machine translation engines. System 400 includes user application 310, translation request 320, translation improvement module 330, user-specific translation data 340 and remote translator engine 370, which are similar to, or the same as, identically-named modules depicted in FIG. 3. Translation request 320 includes user identification information 320-1, source language 320-2, target language 320-3, and source string 320-4, which are also similar to, or the same as, identically-named data items depicted in FIG. 3.

Translation request 320 is communicated from user application 310 to translation improvement module 330 in any of the ways discussed in the context of FIG. 3. Translation improvement module 330 includes normalization module 330-1, tokenization module 330-2 and translation output generation module 330-4, which are similar to, or the same as, corresponding identically-named modules depicted in FIG. 3.

In system 400, normalization module 330-1, tokenization module 330-2 and translation output generation module 330-4 represent one or more related processes or applications that are executed on the same one or more processors. These processes or applications may share data between themselves at runtime in any of a variety of ways known in the art. In some other embodiments, translation improvement module 330 may not logically comprise a normalization, tokenization and a translation output generation module. Rather, in such embodiments, translation improvement module 330 may be executed as a monolithic application or process that itself performs at least all of the normalization, tokenization and output generation functions discussed herein.

Normalization module 330-1 receives the translation request 320 and performs normalization as discussed, for example, in the context of FIG. 2. A normalized string generated as a result of the normalization process is then received by tokenization module 330-2 and tokenized as previously discussed. As depicted in FIG. 4, translation improvement module 330 is communicatively coupled to a memory that stores user-specific translation data 340, to user application 310, and to remote translator engine 370.

User-specific translation data 340 includes at least the following data stored on one or more memories: normalization data 360-1, translation memory data 340-2, source-identification rule data 340-3 and glossary data 340-1. Additionally, system 400 also includes sequestered data 350 that is stored in the same or a different memory or memories that house translation data 340. The user identification information 320-1 of translation request 320 may be associated with, and used to identify translation data 340, for use by translation improvement module 330 during for normalization, tokenization and/or translation output generation.

In a manner similar to that discussed in the context of FIG. 3, normalization module 330-1 uses normalization data 360-1 to normalize source string 320-4, and tokenization module 330-2 uses one or more of glossary data 340-1, translation memory data 340-2, source-identification rule data 340-3, and sequestered data 350 to tokenize the normalized source string 320-4. After source string 320-4 has been normalized and tokenized, it is communicated to remote translator engine 370 for translation. Translation improvement module 330 thereafter receives or retrieves a translation of the normalized and tokenized source string 320-4 from remote translator engine 370, and translation output generation module 330-4 processes the translated string, in a manner similar to that described in the context of FIG. 3, to generate a finalized translated string. After the finalized translated string in generated, translation output generation module 330-4 makes it available to user application 310.

Figure 5:
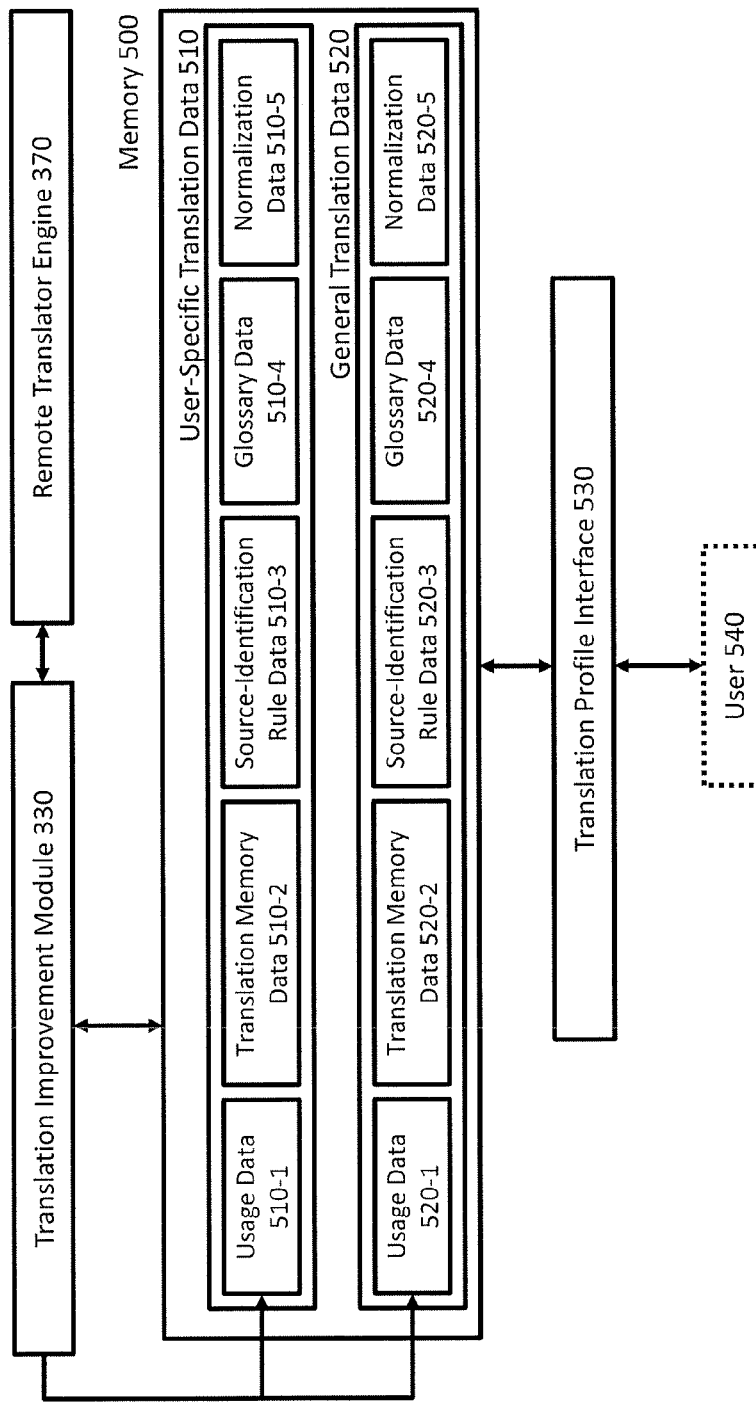

FIG. 5 illustrates an exemplary system 500 for improving machine translations. As depicted in FIG. 5, system 500 includes translation improvement module 330, remote translator engine 370, memory 500, translation profile interface 530, and a user 540. Translation improvement module 330 and remote translator engine 370 may be similar to, or the same as, the corresponding identically-named modules depicted in FIGS. 3 and 4, and memory 500 may be any type of memory described in the context of FIG. 1.

Memory 500 stores at least user-specific translation data 510 and general translation data 520. In some embodiments, user-specific translation data 510 and general translation data 520 may be housed in separate memories. User-specific translation data 510 includes, for example, usage data 510-1, translation memory data 510-2, source-identification rule data 510-3, glossary data 510-4 and normalization data 510-5. And general translation data 520 includes, for example, usage data 520-1, translation memory data 520-2, source-identification rule data 520-3, glossary data 520-4 and normalization data 520-5. Translation memory data 510-2 and 520-2, source-identification rule data 510-3 and 520-3, glossary data 510-4 and 520-4, and normalization data 510-5 and 520-5 may be any type of translation memory data, source-identification rule data, glossary data, and normalization data, respectively, described in the context of FIGS. 1-4.

Translation profile interface 530 is a user interface associated with an application that allows an authorized human user and/or an authorized automated process such as an automated script to add to, delete from, or otherwise update data stored in memory 500. For example, translation profile interface 530 may be a web interface to one or more databases in memory 500 that stores user-specific translation data 510 and general translation data 520. It may help users create and update glossary, translation memory, and source-identification rule data by providing, for example, a checklist of the various types of information that could be sequestered and preserved in translation (e.g., account numbers, telephone numbers), and prompting users to identify words or phrases in specific source languages that may be categorized as Do Not Translate' items for inclusion as part of the user's glossary data.

Translation profile interface 530 may be used to create a customer or user profile that allows the customer or user to specify and manage the exactness with which source strings must match data in user specific translation data such as glossary or translation memory data. Such information could then be used to adjust algorithms used for tokenization and normalization. For users who generate source strings from chat forums, for example, matching criterion may be loosened in order to allow misspelled or ill-punctuated source strings to match semantically-related strings present in the glossary or translation memory. Users may also be able to use user translation profile interface 530 to set and change default preferences for case sensitivity, for the normalization of white space, and for indicating whether or not punctuation may be ignored when searching source strings against data from the glossary or translation memory. Automatically-set defaults for searches against translation memory data may indicate that searches are to be case insensitive, white space is to be normalized, and intra-sentence punctuation is to be ignored. Automatically-set defaults for searches against glossary data may be identical to the above defaults, except that the default for intra-sentence punctuation may be to always take such punctuation into account (i.e., NOT to ignore intra-sentence punctuation).

Translation profile interface 530 may be used to create a new user account with the provision of certain identifying information such as the name and address of the entity for whom a new user account is being created, applicable language directions, and one or more third-party translation engines that may be utilized for translations associated with the user account.

Translation profile interface 530 may also allow the creation of a user profile comprising one or more language directions, one or more specified applications (e.g., a remote translation engine for use in performing translations or an application that will be used to generate translation requests), and an associated tenancy which identifies user-specific translation data (e.g., user-specific translation data 510) associated with a particular user.

The user in system 500 may be any user described in the context of FIG. 1. For example, the user may be a linguist who is familiar with the language needs of a particular business' customers, and the business' policies with respect to sequestering private customer information such as customer names and account numbers. Using translation profile interface 530, such a user may create or modify regular expressions, and save them as part of source-identification rule data 510-3. Note that rule data 510-3 is depicted as being associated with user-specific translation data 510, which in turn may be associated with a single human user or an entity user such as a business. When translation data 510 is associated with a user that is a business, it may be applied to translations provided for any customer or other entity associated with the business.

The user in system 500 may also create or modify regular expressions for storage as part of source-identification rule data 520-3, which is depicted as being associated with general translation data 520. While data stored as part of translation data 510 is generally applicable to translations associated with one or more specific users, such as a particular business entity and its customers, general translation data 520 is applicable to users who may not have any predefined translation data and/or who are interested in applying additional translation data not specifically created in accordance with their privacy and/or other business policies.

With appropriate authorization, user 540 may also use translation profile interface 530 to create or update translation memory data (e.g., translation memory data 510-2 or 520-2), glossary data (e.g., glossary data 510-4 or 520-4), or normalization data (e.g., normalization data 510-5 or 520-5).

In a non-limiting exemplary use of system 500, user 540 is an authorized representative of Z inc., the provider of a customer support application that allows its users to exchange text messages with customer support staff at various businesses. A subset of these businesses require that various words and phrases are never translated, that various other words and phrases are translated in specific ways, and that certain types of data be sequestered from any third-party or remote translation engines used to translate messages. And another subset of these businesses, however, do not have any stated policies surrounding the translation of customer messages.

Continuing on with this example, when user 540 attempts to use translation profile interface 530, he or she may first be prompted to provide identification information (e.g., a user name and password) in order to determine if user 540 is authorized to access translation profile interface 530. If user 540 is determined to have the requisite authority to access translation profile interface 530, user 540 may thereafter attempt to add regular expressions for recognizing and sequestering private information (e.g., account numbers of a particular format) to the user-specific translation data associated with a particular business, B inc. At this point, user 540's authorization to edit the user-specific translation data of B inc. may need to be verified using additional information submitted by user 540. Alternatively, this verification may not require the provision of any further information from user 540, and may be done using the identification information already provided by user 540. For example, the graphical user interface of translation profile interface 530 may determine which set(s) of translation data user 540 is authorized to update when user 540 is originally granted permission to access translation profile interface 530, and thereafter only make visible to user 540, the user-specific translation data that he or she is allowed to view and/or edit.

If user 540 is authorized to access the user-specific translation data for B inc., he/she may: (1) add to the source-identification rule data associated with B inc., a regular expression for identifying account numbers that appear in a particular alphanumeric configuration; (2) add to the glossary data of B inc., an entry that specifies that a particular English phrase should not be translated from English into any other language; and/or (3) add to the normalization data associated with B inc., an entry identifying a specific misspelling of a word routinely used by B inc's customers, and the corresponding standard spelling for that word.

In addition to the functions of the translation improvement module 330 described in the context of FIG. 4, module 330 of system 500 may be used to record and periodically update usage data 510-1, stored as a part of a user's translation data 510. The usage data 510-1 may comprise source string(s) submitted for translation on behalf of an associated user, information identifying the remote translator engine(s) that were used, the time taken to complete the translation process(es), statistical data on whether glossary or translation memory data being found in source string(s) submitted for translation, statistical data on regular expressions stored as part of the user's source-identification rule data being utilized in translations, and the finalized translation string(s) generated.

If permitted by the associated user, such usage data may also be stored as part of the usage data 520-1 associated with general translation data 520, and made available to other users of system 500. Usage data 510-1 and 520-1 may be used to identify, for example, commonly occurring patterns in source strings and commonly occurring translation errors, which may thereafter be used to update user-specific translation data 510 and/or general translation data 520.

Creation of Training Material for
Grammatically-Sensitive Tokenization

Bilingual Training Material: In various embodiments, implementation of grammatically-sensitive tokenization may require creation of bilingual training material for each supported language direction. Such material may have example sentences and their translations for a number of grammatically-sensitive tokens for each grammatical flag that is supported. For example, the bilingual training material for translations between English and Spanish may comprise training material for grammatical flags indicating: a masculine noun in the singular, a masculine noun in the plural, a feminine noun in the singular, and a feminine noun in the plural.

Monolingual Training Material: In various embodiments, implementation of grammatically-sensitive tokenization may require creation of monolingual training material for each supported language direction. Such material may comprise natural language texts in which all of the created tokens are represented in equal amounts.

In many embodiments, training material, such as the above-identified material, may be used to create an instance of a third-party machine translation system that recognizes grammatically-sensitive tokens and treats the tokens as if they were words with the associated grammatical characteristics. Such machine translation systems may then be used in the process of grammatically-sensitive tokenization.

FIG. 6 presents a side-by-side comparison of the translation of the same source string performed using: (1) only a third-party translation engine (depicted in the left column), and (2) an exemplary embodiment that practices the multi-engine machine translation method illustrated in FIG. 1 (depicted in the right column). In the exemplary embodiment, the tokenized source string is shown to contain unique temporary textual elements in place of sequestered private information, and text that has been identified as requiring no translation or a specific predetermined translation. For example, the name "Estivan Rodriguez" is identified and replaced with the temporary element <CUSTOMER-NAME1>, the phrase "calentador solar" is identified and replaced with the temporary element <GLOSSARY-ITEM3>, and the idiomatic sentence "Creo que esto es la gota que colma el vaso" is identified and replaced with the temporary element <TRANSLATIONMEMORYITEM1>. After the tokenized source string has been translated by a remote or third-party translation engine, each of the temporary textual elements is replaced in the translated string with associated text to produce a finalized translated string. In the illustrated example, <CUSTOMERNAME1> is replaced with the sequestered string "Estivan Rodriguez." The temporary element <GLOSSARYITEM3> is replaced with the corresponding customized translation ("solar heater") of the phrase "calentador solar", that was previously identified in glossary data such as glossary data 340-1, and previously associated in memory with the <GLOSSARYITEM3>. And the temporary element <TRANSLATIONMEMORY-ITEM1>, associated with the idiomatic sentence "Creo que esto es la gota que colma el vaso" is replaced by the corresponding customized translation ("I think this is the straw that breaks the camel's back"), previously identified in translation memory data such as translation memory data 340-2, and previously associated in memory with the temporary textual element <TRANSLATIONMEMORY-ITEM1>.

As is illustrated in FIG. 6, the use of a third-party translation engine by itself, without the added benefits of translation customization and data sequestration, can lead to some undesirable results. For example, although the names of individuals and business entities are best left untranslated, the Spanish name "Estivan" is translated to "Steven" in English, and the word "Solar" in the company name "Solar Energy Solutions" is translated to "Solares." Additionally, the format of the account number "5474-345J-324M" is altered to "5474345j324m." Such format changes are best avoided, however, as they can introduce errors in format-sensitive systems that may later be required to interpret the format-altered account numbers. Further, "calentador solar" is translated to "heater solar," which is not grammatically sound.

By contrast, the finalized translated string that results from a translation performed in accordance with the exemplary embodiment avoids these undesirable results. The identification and sequestration of private information results in the name "Estivan Rodriguez" and the account number "5474-345J-324M" remaining unchanged in the finalized translated string, as expected. The use of glossary data to identify and preserve text that should not be translated ensures that company names such as "Solar Energy Solutions" remain untranslated. And the use of translation memory data for customizing translations ensures that the Spanish "calentador solar" is appropriately translated to "solar heater" in English. Lastly, private information such as user names ("Estivan Rodriguez"), account numbers ("5474-345J-324M") and telephone numbers ("212-555-1234") are only processed by trusted or private servers, are never compromised by transmission through insecure channels, and are never made available to untrusted remote or third-party translation engines.

FIG. 7 illustrates an exemplary web interface for managing regular expressions stored, for example, as part of translation memory data 510-2, source-identification rule data 510-3 or normalization data 510-5. The web interface may be part of the translation profile interface 530 discussed in the context of FIG. 5, and may provide access to tools for importing regular expressions from existing regular expression libraries, and for testing regular expressions. New regular expressions may also be created by allowing a user to specify a pattern using a formal syntax, and associating the pattern with a source language (e.g., English (US), as shown) and a user profile (e.g., ACME CORP, as shown). The exemplary web interface may also be used to browse, delete and/or otherwise modify existing regular expressions.

FIG. 8 illustrates an exemplary web interface for managing glossary data stored, for example, as part of glossary data 510-4. The web interface may be part of the translation profile interface 530 discussed in the context of FIG. 5, and allows glossary data to be uploaded as a comma-separated values (CSV) file in a specific format as shown. Other file types and formats may also be used to upload glossary data in similar web interfaces. Users may also be able to create new glossary data by specifying a source term or phrase in a source language, and corresponding target terms or phrases in one or more target languages, and associating the new glossary data with a user profile (e.g., ACME CORP, as shown). In the web interface depicted in FIG. 8, a term or phrase entered in the ' source term' field may be designated a 'Do Not Translate' item if fields for the corresponding target languages are left empty or if the term or phrase in the source language is duplicated in the corresponding target language fields.

The web-interface depicted in FIG. 8 may also include a means for selecting or otherwise specifying grammatical attributes for a desired translation. The selected or specified grammatical values for a given glossary data item may be converted into a grammatical flag that is thereafter associated with the glossary data item.

Figure 9:
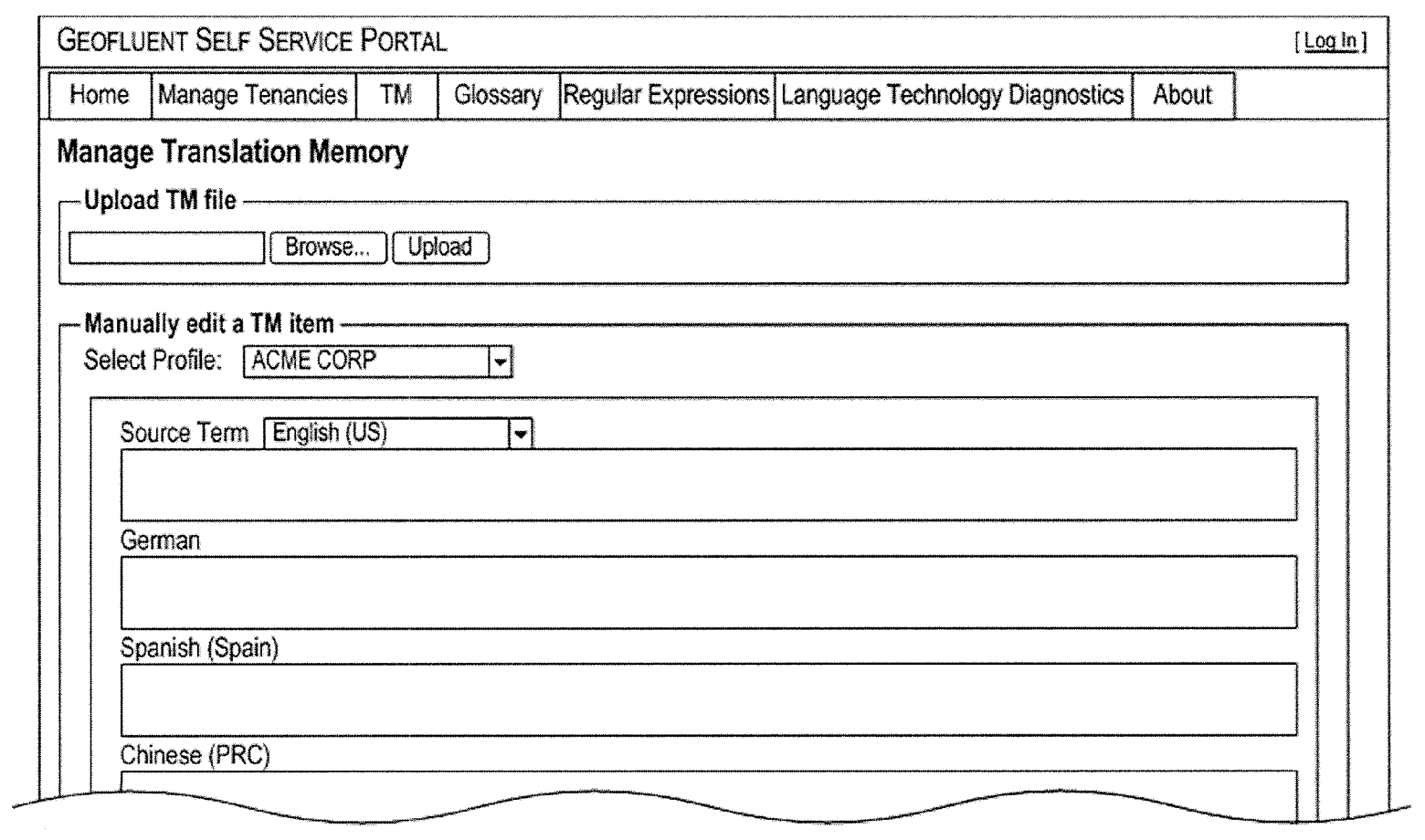

FIG. 9 illustrates an exemplary web interface for managing translation memory data such as the translation memory data 510-2 depicted in FIG. 5. The web interface may be part of the translation profile interface 530 discussed in the context of FIG. 5, and allows translation memory data to be uploaded in bulk using files in various formats, including the TMX 1.4b format. Users of the web interface may also be able to create new translation memory data by specifying, for example, a source term or phrase in a source language and corresponding terms or phrases in one or more target languages, and associating the new translation memory data with a particular user profile (e.g., ACME CORP) as depicted in FIG. 9.

Other embodiments of the subject matter of this disclosure will be apparent to those skilled in the art from consideration of the specification and practice of the disclosed embodiments. Accordingly, it is intended that the specification and examples disclosed herein be considered exemplary only.

What is claimed is:

1. A method for machine translation, comprising:
providing a translation profile interface associated with an application that allows an authorized user to modify user-specific translation data;
receiving, by the translation profile interface, from the authorized user, an update to the user-specific translation data, the update including an instruction for customizing a translation;
receiving a source string in a source language, an indication of a target language, and user identification information associated with the user;
using the user identification information to identify at least one memory with the user-specific translation data;
tokenizing the source string, using at least one processor, to produce a tokenized source string comprising any unique temporary textual elements associated with corresponding target textual elements during tokenization;
obtaining a translated string from a translator, the translated string being at least a partial translation of the tokenized source string and including all of the unique temporary textual elements; and
generating an output string using at least one processor, the generation comprising replacing all of the unique temporary textual elements in the translated string with the associated target textual elements, the generated output string complying with the instruction for customizing the translation.

2. The method of claim 1, wherein the user-specific translation data comprises at least one of: glossary data, translation memory data, or source-identification rule data, and the corresponding target textual elements are stored as part of at least one of the user-specific translation data and sequestered data associated with the user identification information.

3. The method of claim 2, wherein the tokenizing comprises:
searching the source string to identify all portions of the source string that meet a search criterion;
replacing all the identified portions of the source string with corresponding unique temporary textual elements; and
associating each unique temporary textual element with a corresponding target textual element.

4. The method of claim 3, wherein:
the glossary data is configured to associate strings in the source language with strings in the target language;
the translation memory data is configured to associate strings in the source language with strings in the target language; or
the source-identification rule data comprises regular expressions for identifying strings in the source language.

5. The method of claim 4, wherein:
the strings associated by the glossary data are words or phrases,
the strings associated by the translation memory data are translation units comprising sentences and grammatically independent translation units,
the user-specific translation data is stored in at least one of: a database, a comma-separated values file, or a translation memory exchange file, and
the at least one temporary textual element is a unique textual or alphanumeric token.

6. The method of claim 3, wherein searching the source string to identify all portions of the source string that meet a search criterion comprises:
searching to identify a match between a string in the glossary data and a portion of the source string;
searching to identify a match between a string in the translation memory data and a portion of the source string; or
applying at least one regular expression of the source-identification rule data to identify any portions of the source string as private information for sequestration.

7. The method of claim 6, wherein searching to identify a match between a string in the glossary data and a portion of the source string ignores at least one of:
semantically insignificant differences between the string in the glossary data and portions of the source string,
the case of the alphabetical characters in the source string, or
hyphenation in the source-string.

8. The method of claim 3, wherein the sequestered data comprises names, account numbers, addresses and telephone numbers.

9. The method of claim 3, further comprising a normalization step that comprises:
searching the source string to identify all portions of the source string that meet a first search criterion specified in normalization data associated with the user identification information; and
replacing all identified portions of the source string with corresponding normalized strings specified in the normalization data.

10. The method of claim 3, further comprising:
determining that one or more delimiters are used to indicate the presence of do-not-translate terms or phrases within the source string; and
identifying one or more substrings of the source string that are identified by the one or more delimiters as do-not-translate terms or phrases.

11. The method of claim 3, wherein one or more of the unique temporary textual elements comprises a concatenation of a unique numerical identifier of a normalized length and a randomized numerical string of a normalized length.

12. The method of claim 1, further comprising training a machine translation engine using bilingual or monolingual training material.

13. A system for machine translation, comprising:
a translation profile interface receiving, from an authorized user, an update to user-specific translation data, the update including an instruction for customizing a translation;
a memory associating a user identifier with user-specific translation data comprising at least one of: glossary data, translation memory data, or source-identification rule data;
a first application executing on a first one or more processors, the first application:
receiving a source string in a source language, an indication of a target language, and the user identifier; and
tokenizing the source string to produce a tokenized source string; and
a second application executing on a second one or more processors without access to the user-specific translation data, the second application receiving the tokenized source string and outputting a translated string comprising at least a partial translation of the tokenized source string, wherein the first application receives the translated string from the second application and generates an output string, the generation comprising replacing all temporary textual elements in the translated string with associated target textual elements, the generated output string complying with the instruction for customizing the translation.

14. The system of claim 13, further comprising a user interface for creating or updating one or more of glossary data, translation memory data, or source-identification rule data, the user interface comprising one or more interface elements for creating, updating and deleting regular expressions.

15. A system for machine translation, comprising:

a translation profile interface receiving, from an authorized user, an update to user-specific translation data, the update including an instruction for customizing a translation;

a memory associating a user identifier with user-specific translation data;

a first application executing on a first set of one or more processors, the first application:

receiving a source string in a source language, an indication of a target language, and the user identifier;

normalizing the source string to produce a normalized source string; and tokenizing the normalized source string to produce a tokenized source string comprising all temporary textual elements associated with corresponding target textual elements during the tokenizing process; and a second application executing on a second set of one or more processors, the second application:

communicating the tokenized source string to a translator application executing on a third set of one or more processors; and obtaining a translated string from the translator, the translated string being at least a partial translation of the tokenized source string and comprising all the temporary textual elements inserted during the tokenizing process, wherein the first application generates an output string, the generation comprising replacing each temporary textual element in the translated string with an associated target textual element, the generated output string complying with the instruction for customizing the translation.

* * * * *

UNITED STATES PATENT AND TRADEMARK OFFICE
CERTIFICATE OF CORRECTION

PATENT NO. : 10,311,148 B2
APPLICATION NO. : 15/652949
DATED : June 4, 2019
INVENTOR(S) : Marciano et al.

Page 1 of 1

It is certified that error appears in the above-identified patent and that said Letters Patent is hereby corrected as shown below:

In Column 16, Line 5, delete "("Arg 1")," and insert --("Arg1"),--, therefor.

Signed and Sealed this
Twenty-fourth Day of September, 2019

Andrei Iancu
*Director of the United States Patent and Trademark Office*